United States Patent [19]

Fowler

[11] Patent Number: 4,560,354
[45] Date of Patent: Dec. 24, 1985

[54] DEVICE FOR TEACHING DECIMAL MATH

[76] Inventor: Seeber T. Fowler, Rte. 3, Box 1176, Ft. McCoy, Fla. 32637

[21] Appl. No.: 659,968

[22] Filed: Oct. 11, 1984

Related U.S. Application Data

[63] Continuation-in-part of Ser. No. 440,707, Apr. 4, 1983, abandoned.

[51] Int. Cl.$^4$ ............................................. G09B 19/02
[52] U.S. Cl. ..................................... 434/208; 434/207
[58] Field of Search ................ 434/191, 203, 208, 207

[56] References Cited

U.S. PATENT DOCUMENTS

| | | | |
|---|---|---|---|
| 465,811 | 12/1891 | Anderson | 434/203 |
| 651,892 | 6/1900 | Schneider | 434/208 |
| 2,654,164 | 10/1953 | Seidenberg | 434/203 |
| 3,453,748 | 7/1969 | Miller | 434/208 |
| 3,755,924 | 9/1973 | Langieri | 434/208 |

FOREIGN PATENT DOCUMENTS 451619  11/1927  Fed. Rep. of Germany ...... 434/191

*Primary Examiner*—William H. Grieb
*Attorney, Agent, or Firm*—Julian C. Renfro

[57] ABSTRACT

A math teaching device comprising an elongate frame utilizing edge guides disposed along each of its long edges, and a plurality of closely similar counting pieces slidably mounted in an upper portion of the frame. The counting pieces are independently movable, and retained in an operative relationship to each other and to the frame by means of the edge guides. The frame has a recessed lower portion configured to receive an elongate display member, with the display member residing in the frame at a location below the counting pieces. The display member has indicia thereon, with such indicia being placed at a spacing that is consonant with the number and size of the counting pieces utilized. The display member may either be a fixed, integral portion of the elongate frame, or in the form of a slider, such that it can be readily removed, and replaced by another display member containing different indicia. I prefer for the counting-piece-receiving portion of the elongate frame to be of a length corresponding to eleven counting pieces, such that a single indicia space in any of eleven possible locations can be viewed by appropriate positioning of the counting pieces. The preferable indicia for the display member are the numerals zero through nine, with the space at the right hand end of the display member being blank.

21 Claims, 8 Drawing Figures

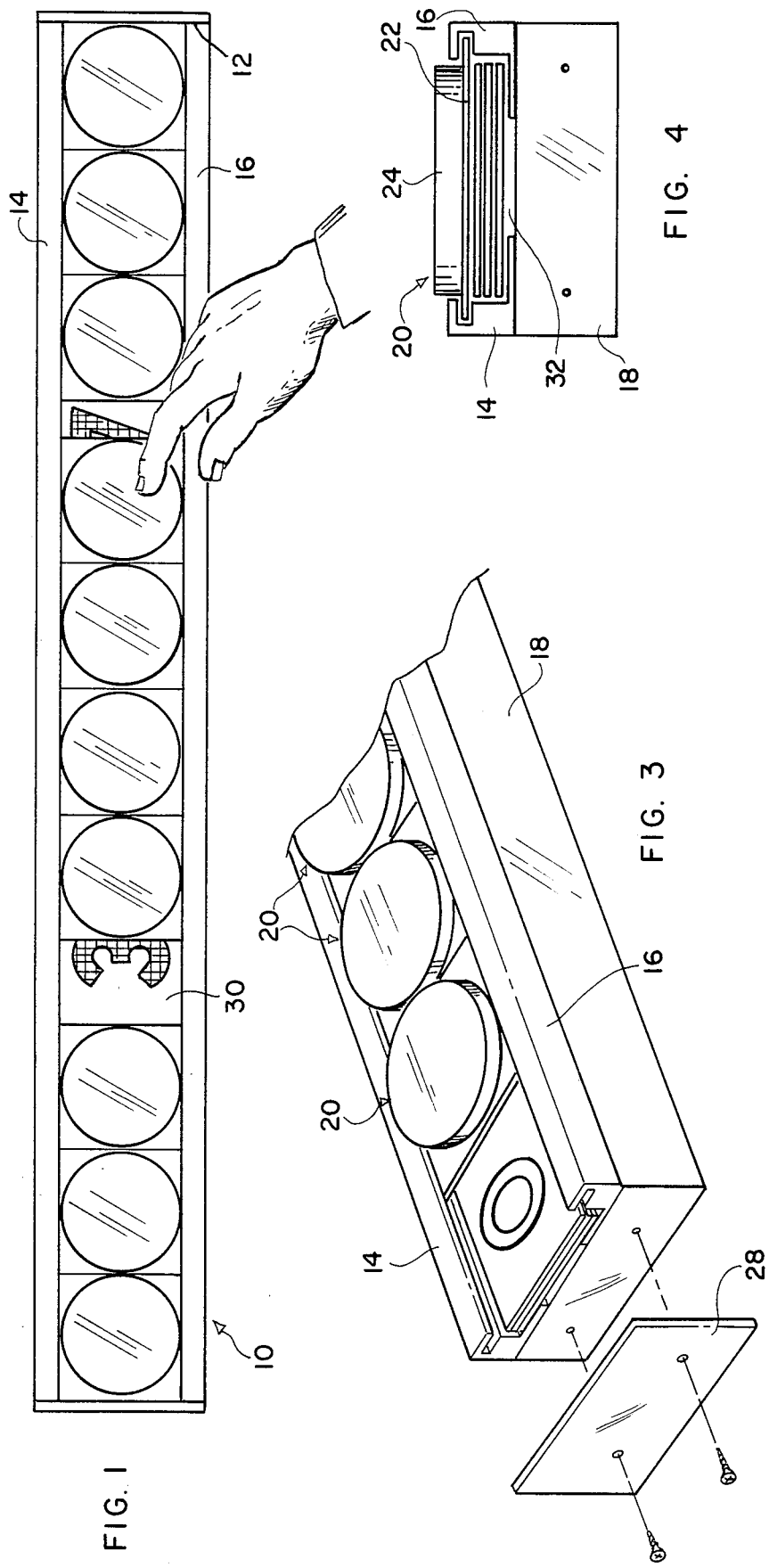
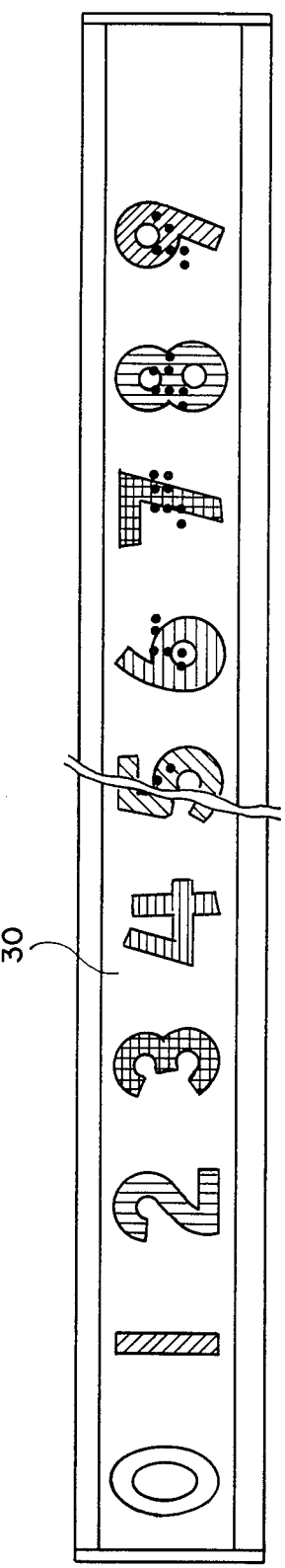

DEVICE FOR TEACHING DECIMAL MATH

RELATIONSHIP TO EARLIER INVENTION

This is a Continuation-in-Part of my copending patent application Ser. No. 440,707 entitled "Digital Readout Abacus", filed Apr. 4, 1983, now abandoned.

BACKGROUND OF THE INVENTION

In this computer age it would appear that large segments of the population are highly proficient in the manipulation of numbers, and able to deal with our decimal system with ease. However, it is a fact that many adults are handicapped by not ever having achieved a facility in dealing with numbers, and my opinion is that those adults would have been spared this problem had they been introduced to an easily understood display of the numbers zero through nine in an appropriate teaching device while they were still young.

Others have endeavored to provide counting devices and educational devices, and the Anderson Pat. No. 465,811 entitled "Adding Machine" taught a device generally in the nature of an abacus, involving a frame utilizing a plurality of wooden bars each containing nine slidable buttons or beads. The Anderson device differed from other abacus type devices by presenting on the wooden bars, the numbers zero through nine. However, there were only nine counting pieces and ten spaces on such bars, and the numerals were quite small, so the Anderson type device did not readily lend itself to instructing young children in the use and value of numbers.

The Langieri, Jr. et al U.S. Pat. No. 3,755,924 entitled "Arithmetic Teaching Device" represented some advance over the Anderson device, but it was obviously of expensive construction and of too fragile a nature as to lend itself in the instruction of children. However, even more significant is the fact that Langieri includes a number 10 placed in the same column with the single digits, (see Column 2, line 34), which is a type of thing that I have found to be quite confusing to a young child, for the introduction of the number 10 contemporaneously with the introduction of the numbers zero through nine may provide a stumbling block substantially inhibiting his ability to deal readily and easily with our decimal system.

It was to overcome the serious disadvantages of the foregoing devices and others of that general nature that I was impelled to design the present highly advantageous device for teaching the decimal system to young children with minimal supervision.

SUMMARY OF THE INVENTION

In accordance with this invention I provide a math teaching device comprising an elongate frame utilizing guide means along each of its long edges, and a plurality of closely similar counting pieces mounted upon an upper portion of the frame. The counting pieces are independently movable, and retained in an operative relationship to each other and to the frame by the guide means. The frame has a recessed lower portion configured to receive an elongate display member, with such display member residing in the frame below the counting pieces. The counting pieces are preferably opaque, thus limiting the portion of the display member visible to the user at any given moment to only a small part of the total display. Although on occasion the display member could present a surface that is entirely blank, in most instances I prefer to use a display member providing indicia thereon that serve as a very helpful means for teaching the number relationships to a young person.

The elongate display member could be a fixed, integral portion of the elongate frame, but I prefer for the display member to be in the form of a slider, such that it can be readily removed from the frame, and either turned over to present a display of a different type for the instruction of the child, or else that slider replaced by a slider having an entirely different display. For the convenience of the user, the frame can have a recessed lower portion large enough to receive a plurality of elongate display members, with, however, the indicia of only one display member being visible to the user at a time.

Advantageously, the frame I utilize is of a length corresponding to eleven counting pieces, but I utilize only ten opaque counting pieces on the frame, with the result being that I can make any one of eleven selected locations on the display member visible at any one time. The eleventh space or location of most of the various display members that I use is preferably blank.

Preferably the display member contains the arabic numerals zero through nine presented in spaced locations thereon, with each numeral being of a size to be occluded on occasion by a single counting piece. Although the arabic numerals presented on the flat surface of the display member can be in a single color, I prefer for the numerals to appear in several different colors. Quite advantageously, I can array these numerals to read either left to right, or from the top down. I have found that optimal arrangement to involve each of the numerals 1 through 4 being of a color that is identical to the color of the numeral with which it makes a total of 10. For example, if the numerals 1 through 4 on the display member are green, red, yellow, and blue, respectively, the numbers 6, 7, 8 and 9 would be blue, yellow, red, and green, respectively, so that each pair of numerals of a like color totals ten. As will be explained hereinafter, this type of arrangement is advantageous in several respects in the instruction of young children. The eleventh space of the display member, the space at the right, is blank. The display members usable with my device can take any of several forms, with the goal being to provide a math teaching device for the instructor as will make it possible for him or her to get the young child off to a good start, and with a clear understanding of the critically important relationships of the numerals zero through nine.

It is therefore a principal object of my invention to provide a math teaching device serving to acquaint a young child with the decimal counting system, accomplished in a manner in which confusion is minimized.

It is another object of my invention to provide a highly versatile yet inexpensive math teaching device involving an elongate frame in which eleven spaces appear, with which ten closely similar counting pieces are utilized.

It is still another object of my invention to provide a math teaching device of non-complex construction that readily enables an instructor to teach place value to a young child.

It is yet another object of my invention to provide a teaching device involving an elongate frame in which a selected elongate display member is utilized, with such display member containing various indicia, such as the numerals zero through nine, with ten counting pieces being movable to selected locations along such elongate frame, so that only a single selected indicia will be visible at any given time.

These and other objects, features and advantages of my invention will be more apparent as the description proceeds.

BRIEF DESCRIPTION OF DRAWINGS

FIG. 1 is a view of a preferred configuration of my math teaching device, the display member of which contains the numerals zero through nine, with movement of the ten counting pieces usable directly above the numerals occluding all of the numerals in this instance, except for portions of the numerals 3 and 7;

FIG. 2 is a bisected view revealing that my novel display member may either utilize the unembellished numerals zero through nine, or these numerals having Braille characters superimposed upon the respective numerals zero through nine;

FIG. 3 is a fragmentary perspective view taken at one end of the device of FIG. 1 in order to reveal the removable end member making it possible for the user to select the display member that is visible at any given moment;

FIG. 4 is an end view of the device of FIG. 1, revealing that a plurality of display members may be contained in a recessed lower portion of the elongate frame, so that the teacher can select the display member appropriate in each particular instance;

DETAILED DESCRIPTION

Figure 5:
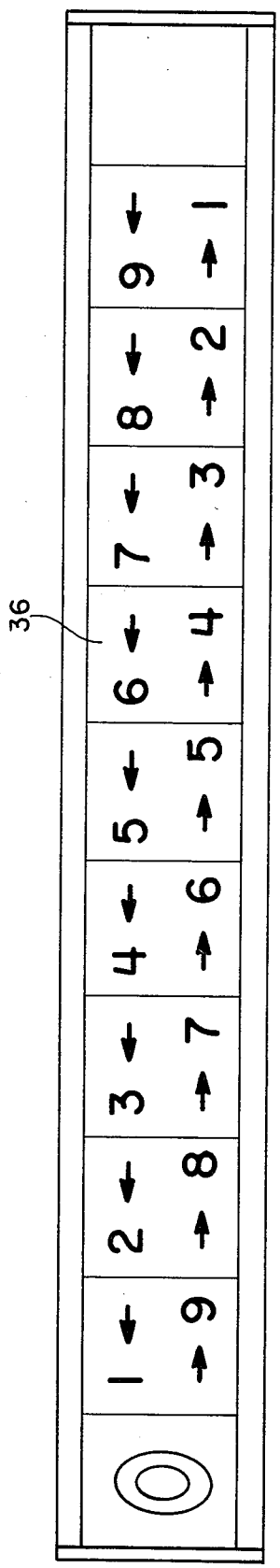
FIG. 5 is a view revealing that the display member may involve a pair of complementary numbers utilized in nine of the eleven spaces of the display member, with the space at each end of the display member being blank, or else the space at the far left containing a zero.

Turning first to FIG. 1, it will there be seen that I have illustrated a preferred configuration of my math teaching device 10, utilizing a frame 12 of elongate configuration. Guide means are provided along each of the long edges of the frame 12, these being guide means 14 utilized along the upper part of the face of the frame, and guide means 16 utilized along the lower part of the face of the frame.

As may be seen in FIGS. 3 and 4, the guide means 14 and 16 are preferably secured by glue, adhesive, or other suitable means on a base member 18, with the guide means being configured so as to receive a plurality of counting pieces 20 that extend between the guide means, being readily slidable in ways or slots defined therein. The guide means 14 and 16 may for example be plastic extrusions, but I am not to be limited to this. The closure member 28 may be used at either end of the frame, and is made of plastic or other suitable material, held in place by two small screws, for example.

The counting pieces 20 are closely similar to each other, and preferably each counting piece has a generally rectangularly shaped base member 22 whose dimension is such as to be received in the respective slots or ways of the guide means 14 and 16. Disposed upon each base member is an upstanding member 24 that may, for example, take the form of a circular component in the nature of a checker of the type used in the game known as "checkers", although I obviously am not to be limited to this type of construction.

An elongate display member 30 is partially visible in FIG. 1, but revealed in greater detail in FIG. 2. As is apparent from FIGS. 3 and 4, this display member is received in the recessed lower portion 32, which is located above the wood or plastic of the base member 18. The preferred types of display member construction are apparent from an inspection of FIG. 2, where the left half of the display member is shown to contain a preferred type of numeral, whereas on the right half, I reveal that appropriate Braille characters can optionally be superimposed on the respective arabic numerals zero through nine. Other display member configurations will be discussed hereinafter.

The display member 30 of FIGS. 1 and 2 may be regarded as in effect being divided along its long dimension into eleven spaces of equal size. The numerals zero through nine are disposed in ten of the eleven spaces, beginning at the left, with the space at the far right being deliberately blank.

Although the ten numerals of display member 30 may be of a single color, I prefer to utilize five or more colors, with the numerals one through four being of a color identical to the color of the numeral with which it makes a total of ten. For example, if the numeral 1 is of the color green, the numeral 9 will likewise be of the same color. Similarly, the 2 and the 8 are of the same color, for example red, the 3 and the 7 are of the same color, such as for example yellow, and the 4 and the 6 are of the same color, such as for example blue. This arrangement is utilized because I have found that the child makes a subliminal association of each two digits that total ten, and this concept is quite helpful in getting the child off to an good start in grasping the important number concepts. Obviously, I am not to be limited to usage of these particular colors, which were cited illustratively.

Figure 7:
FIG. 7 is an edge view of a typical display member in which the numbers or other characters utilized on the face of the display member are raised.

For want of better terminology, I use "buddy numbers" to connote the 1 and the 9, the 2 and the 8, and the other combinations of numbers totalling 10. Alternates to this terminology are the words "decifactors" or "complementary numbers". Children who are first learning to form the numbers 0 through 9 by writing them can utilize my math teaching device quite readily if the numbers of the display member are raised a bit, in the manner depicted in FIG. 7, so that the coordination of mind and hand might be developed by tracing and feeling the shape of the numbers with a finger. I prevent the raised numbers from interfering with movement of the counting pieces along the guide means 14 and 16 by having appropriately flattened shoulder portions at the locations where the base members 22 of the counting pieces are received in the slots or ways formed in the members 14 and 16.

Figure 6:
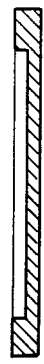
FIG. 6 is an edge view of a typical display member in which the numbers or other characters utilized on the face of the display member are recessed.

An alternative to the use of raised letters is the use of a display member in which each of the numbers thereon has been recessed, as generally indicated in FIG. 6, such that the child of diminished vision can run the tip of his or her finger along the number, and thereby establish its numerical value.

In FIG. 5 I reveal a display member 36 built upon the "buddy number" concept, in that in the second space of this display member, the numbers 1 and 9 appear; in the third space the numbers 2 and 8 appear; and so forth. The first and the eleventh spaces of display member 36 either are deliberately blank, or else a zero is used in the space on the far left. It is to be realized that ten counting pieces 20 are utilized in the frame of the math teaching device depicted in FIG. 5, with it therefore being possible for only one of the eleven spaces of this display member to be visible at any one moment. This arrangement makes it readily possible for the child to learn these important numerical relationships. The small arrows may be used in FIG. 5 to indicate how many pieces are to the right, and to the left, of the space visible at any one moment, as a result of counting piece positioning.

Figure 8:
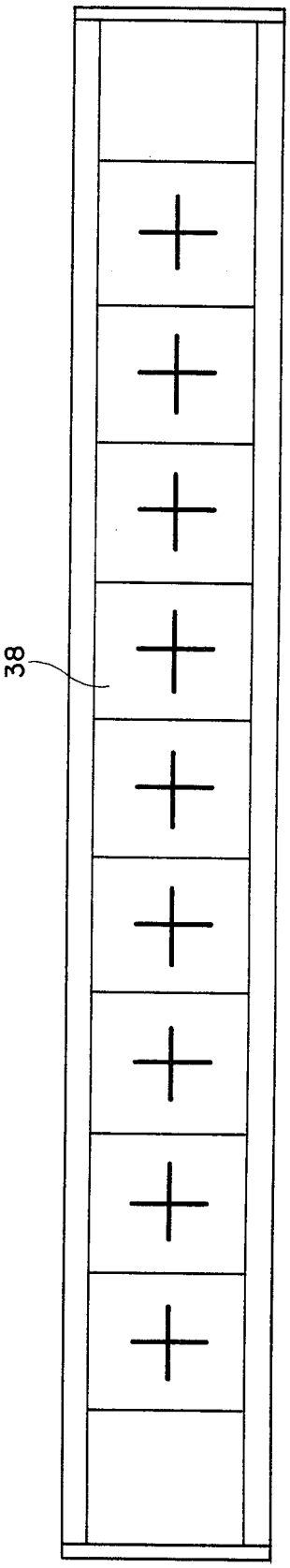
FIG. 8 is a view revealing that the display member may utilize a plus sign disposed in nine of the eleven spaces of the display member, with the space at each end of the display member being blank.

In FIG. 8 I reveal another embodiment of my display device in which the left and right ends of the device 38 are blank, but with the remaining nine spaces each having a plus mark therein. This embodiment I have found to be valuable in many instances in helping a student further understand the value of the decimal system.

In the use of the various embodiments of my device, even a young child can obtain a very useful and educational "hands on" experience with numbers and numerical concepts, for the counting pieces can be attractively colored and easily manipulated. He or she can obtain with minimal intervention and instruction from the teacher, the ability to work with numbers, to learn to count, to learn to add, subtract, multiply and divide, and quite importantly, to learn place value.

The term place value, as used hereinbefore, is a well known concept where numerals are placed in lateral conjunction, with their value increasing in established increments from right to left. In the case of the decimal system, the value is units, tens, hundreds, thousands, and so forth. For instance, when three numerals one are placed side by side to form 111, the value is equal to 100+10+1, or one hundred and eleven.

As should now be clear, using my decimal teaching device, even with minimal intervention and instruction from the teacher, imagery of the mechanics of basic mathematics at work is developed by the child as he or she manipulates the counting pieces in the manners of adding, subtracting, multiplying and dividing within the simple confines of the single digit row, 0 through 9.

Thereafter, the child can learn to account for sums greater than 9 by regarding all ten of the counting pieces of my device as a unit, a decade, that is counted by the same 0 through 9 disciplines that have already been learned, combining that decade number, which may be written on a work pad, in a horizontal union immediately to the left of the number representing the count of single pieces, thus enabling the child to learn the pattern of decimal augmentation that applies to the counting of infinite values.

Quite importantly, my novel devices for teaching decimal math may be used in pairs, threes, or even larger groupings, with the numbers of the display members, when teaching the student place value, preferably being painted or otherwise created so as to be in a vertical array. In such instances, the device on the right would represent the units column, the next devices would represent the tens column, and the third device, if used, would represent the hundreds column.

It is important that the reader understand the procedure being generally illustrated in FIG. 1 of the drawing. Here, the goal is to add to the three counting pieces illustrated at the left, the number 4, which is represented by the four counting pieces at this moment being moved by the student's right hand. As is apparent, the number 3 of the display member is visible near the left hand edge of the device, and as the four pieces are moved toward the three pieces at the left, the number 7 of the display member becomes visible, thereby vividly indicating to the student that the three pieces on the left are represented by a digit or numeral "3", and that a "7" represents the sum of the "3" and a "4".

As should be apparent, this procedure is most helpful to a student in developing an imagery of the mechanics involved in an addition procedure.

Whereas counting or adding involves the pieces being moved from the right to the left, subtracting or "dis-counting" involves moving the pieces from the left to the right.

For example, if four is to be subtracted from seven, then seven counting pieces of the device would be moved to the left, which would cause the "7" of the display member to be visible. Then, starting at the right end of the seven pieces, the user would count four pieces toward the left, and then move these four pieces to the right, with this causing the "3" of the display member to become visible, which of course is the proper answer.

To illustrate multiplication, the multiplying of 3 times 3 involves all ten pieces being initially moved to the right, so as to expose the zero of the display member at the left. Then, a first group of three pieces is moved to the left, and then this procedure is repeated a second, and then a third time. When the second group of three pieces is moved to the left, a "6" becomes visible, whereas when the third group of three pieces is moved to the left, the "9" becomes visible, which of course is the final answer.

The multiplying of 4 times 4 involves the concept of place value, which many teachers regard as the single most difficult concept involved in teaching mathematics to a student. In this illustration, which involves the zero being initially visbile at the left, four pieces are moved to the left, which of course involves the "4" becoming visible. Then, when the second group of four pieces is moved to the left, the "8" becomes visible, but at this point, there are not enough pieces at the right hand side of the device as will permit a third group of four to be moved to the left. There are only two pieces at the right, which pieces are moved to the left to momentarily expose the blank portion used at the far right of the display member.

At this juncture, all of the counting pieces are moved, as a group, to the right, so as to enable further counting. The student at this point should write a "1" on a nearby work pad, and then he or she proceeds to pick up counting the remaining portion of the third group four, which involves two pieces moved to the left to momentarily expose the "2". Then, when the fourth group of four pieces is moved to the left, the "6" of the display member is exposed. Inasmuch as the student had already placed a "1" on the pad, indicating that ten pieces have been counted once, that 1 when taken in conjunction with the 6 on the display member represents or indicates that 16 is the resulting product when 4 is multiplied by 4.

When dividing, such as 8 by 4, eight pieces are moved to the left, exposing the "8" of the display member. Then, starting from the left end of the selected eight pieces, four pieces (representing one group) are moved from left to right. At this point, the 4 is visible which, incidentally, means that four more pieces remain. Then, when the second group of four is moved to the right, the zero of the display member becomes visible, which shows that four goes evenly into eight two times, which is the number of times a group of four was moved.

Now, if we sought to divide 9 by 4, after a group of four pieces was moved to the right twice, the "1" would remain at the left of the device, which is one part of a group of four, and this indicates a fraction, 1 over 4, which is to be interpreted as meaning that 9 divided by 4 leaves a quotient of $2\frac{1}{4}$. Therfore, it is to be seen that my device is even valuable in helping the student learn and understand about fractions.

As should now be apparent, I have provided a highly versatile yet inexpensive device for teaching the decimal system to students of all ages. My device combines the attributes of clarity and simplicity in the form of a teaching device usable and affordable by all.

I claim:

1. A math teaching device particularly designed for teaching place value to students, comprising an elongate frame utilizing guide means disposed along each of its long edges, a plurality of closely similar counting pieces slidably mounted on an upper portion of said frame, which counting pieces are independently movable, and retained in an operative relationship to each other and to said frame by said guide means, said frame having a recessed portion configured to receive an elongate display member, with a display member residing in said frame at a location below said counting pieces, said elongate display member being in effect divided along its long dimension into eleven spaces of approximately equal size and having indicia thereon, with such indicia being placed at a spacing that is consonant with the size and number of counting pieces utilized, said indicia including ten numerals placed in ascending order from left to right and involving no duplicate numerals, with the eleventh space at the far right remaining blank.

2. The math teaching device as recited in claim 1 in which said display member is a fixed, integral portion of said elongate frame.

3. The math teaching device as recited in claim 1 in which said display member is in the form of a slider, such that it can be readily removed, and replaced by another display member.

4. The math teaching device as recited in claim 1 in which said recessed portion of said frame is large enough to receive a plurality of elongate display members, but with only one of such display members being visible at a time.

5. The math teaching device as recited in claim 1 in which only one of the indicia of said display member is visible at a time, the particular indicia visible in each instance being a function of the positioning of said counting pieces.

6. The math teaching device as recited in claim 1 wherein said counting pieces are opaque.

7. The math teaching device as recited in claim 6 in which ten counting pieces are utilized, with the counting-piece-receiving portion of said frame being of a length corresponding to eleven counting pieces, thus to make it possible for the counting pieces to be positioned such that the indicia appearing on the display member in any of the locations can be viewed.

8. The math teaching device as recited in claim 1 in which said numerals are arabic numerals zero through nine, with each numeral being of a size to be occluded on occasion by a single counting piece.

9. The math teaching device as recited in claim 8 in which the arabic numerals presented on said display member are in a single color.

10. The math teaching device as recited in claim 8 in which the arabic numerals presented on said display member are in different colors.

11. The math teaching device as recited in claim 8 in which the Braille characters corresponding to each of the arabic numerals on said display member are superimposed on the respective numerals.

12. A math teaching device comprising an elongate frame utilizing guide means disposed along each of its long edges, a plurality of closely similar counting pieces slidably mounted on an upper portion of said frame, which counting pieces are independently movable, and retained in an operative relationship to each other and to said frame by said guide means, said frame having a recessed portion configured to receive an elongate display member, with a display member residing in said frame at a location below said counting pieces, said elongate display member having indicia thereon, with such indicia being placed at a spacing that is consonant with the size and number of counting pieces utilized, said display member having the arabic numerals zero through nine presented in spaced locations thereon, with each numeral being of a size to be occluded on occasion by a single counting piece, said arabic numerals presented on said display member being in at least five different colors, with each of the numerals 1 through 4 being of a color that is identical to the color of the numeral with which it makes a total of 10.

13. A math teaching device comprising an elongate frame utilizing guide means disposed along each of its long edges, a plurality of closely similar counting pieces slidably mounted on an upper portion of said frame, which counting pieces are independently movable, and retained in an operative relationship to each other and to said frame by said guide means, said frame having a recessed portion configured to receive an elongate display member, with a display member residing in said frame at a location below said counting pieces, one flat surface of said elongate display member being in effect divided along its long dimension into eleven spaces of approximately equal size, with the space at the far right remaining blank, said display member having indicia thereon in at least nine spaces, with such indicia being placed at a spacing that is consonant with the size and number of counting pieces utilized.

14. The math teaching device as recited in claim 13 in which the numbers zero through nine are disposed in numerical order in ten of said eleven spaces on said display member, beginning at the left.

15. The math teaching device as recited in claim 13 in which two numerals, in each instance totalling ten, are disposed in nine of said spaces on said display member, with the end space on each end of said display member being left blank.

16. The math teaching device as recited in claim 13 in which an array of nine plus signs is disposed in nine of such spaces on said display member, with a blank space existing at each end of said plus sign array.

17. The math teaching device as recited in claim 13 in which the numerals zero through nine are disposed on said display member in ten of said eleven spaces, beginning at the left, with the space at the far right being blank, and with the Braille characters corresponding to each of the arabic numerals being superimposed on the respective numerals.

18. The math teaching device as recited in claim 13 in which said display member contains raised indicia.

19. The math teaching device as recited in claim 13 in which said display member contains recessed indicia.

20. The math teaching device as recited in claim 13 in which the numerals zero through nine are represented on the display member, arranged horizontally to be readable from left to right.

21. The math teaching device as recited in claim 13 in which the numerals zero through nine are represented in a vertical array on said display member, being readable from the top down.

* * * * *